Patented Dec. 12, 1933

1,939,635

UNITED STATES PATENT OFFICE 1,939,635

METHOD OF CONCENTRATING AQUEOUS RUBBER DISPERSIONS

Henry B. Townsend, Belmont, Mass., assignor to Vultex Corporation of America, Cambridge, Mass., a corporation of Massachusetts No Drawing. Application April 23, 1931
Serial No. 532,283

11 Claims. (Cl. 18—50)

This invention relates to an improved method of concentrating an aqueous vulcanized rubber dispersion and to the concentrated material produced by the method.

The invention has for one of its objects to provide a simple, quick, highly effective and commercially feasible method of making a highly concentrated, purified and stable vulcanized rubber dispersion which may be used for many purposes in its concentrate or paste form or may be transported and stored cheaply and conveniently in concentrated form and later diluted to the required solid content by the addition of water.

Various methods are known by which rubber latex or rubber latex preserved with ammonia may be thickened or concentrated for more convenient use, for greater facility and less expense in transportation and for certain applications where a thickened or more viscous material or heavier solid content is indicated. Creaming agents have been added to commercial latex causing a separation of the material into layers, the upper layer containing the larger proportions of the rubber solids and the lower layer containing the larger proportion of the serum. By drawing off the upper layer, a material is recovered having a rubber solid content much greater than the average 30% rubber solid content of normal latex. By this method, however, much of the protein, resin and water soluble matter is carried over to the recovered concentrate together with some of the creaming agent dissolved in the cream. Latex has been thickened by the addition of zinc oxide. This does not effect a true concentrate but merely thickens and increases the viscosity. Concentration has been proposed by thermal evaporation methods, and by coagulating in the presence of an anti-coagulant whereby thickening or some agglomeration may be effected without complete coagulation.

A film produced by evaporation of the dispersing phase of latex is partially reversible, i. e. such latex rubber, spots with water, turning white. Such rubber is readily injured by even normal humidity changes. This spotting is most noticeable on the upper surface of the film as dried, and is caused by impurities present in the serum. Some of these impurities are sugars or water-solubles, while others are of a protein nature. The removal of these materials has been proposed previously, as by dialysis after heating with caustic. Such methods are not well adapted to commercial work, and such purified rubber is not suitable for vulcanization. It is recognized that the natural proteins of rubber are a distinct aid to vulcanization, and rubber practically devoid of such natural proteins is commonly vulcanized only after suitable proteins are returned to it. Furthermore, such processes while removing protein, water-solubles, or both, frequently require the addition of materials that may be equally as harmful to the desired irreversible properties of the latex rubber.

The removal of protein, without adding some foreign protective colloid, is a removal of the natural protective or stabilizer for the latex. While such purified latex may be equally as stable as regards friction, it shows exceedingly high instability when brought in contact with sulphur, zinc oxide or accelerators as commonly used for vulcanization. I have discovered that by submitting latex to a vulcanizing operation, I can then remove the undesirable protein and water-soluble materials in a centrifugal of the general type used for purifying oils, and obtain a purified and irreversible vulcanized rubber upon evaporation of the dispersing phase. By repeated operations, I am able to secure substantially pure and commercially stable concentrates which have 60% to 65% total rubber solids. By a single operation, I have produced a material comprising 60% total vulcanized rubber solids.

In carrying out my invention according to a preferred method, ordinary commercial rubber latex as received from the plantation having a solid content of approximately 30–40% and without additional anti-coagulant or foreign stabilizer is poured in a steam jacketed container, a water paste is prepared containing four parts of sulphur, one-half part of zinc oxide, and one-half part of piperidonium penthamethylene dithiocarbamate dispersed in water of approximately four times the weight of the other materials. The mixture is added to the latex in the container and with slow agitation is gradually brought to a temperature of 168° F. over a period of one hour. This temperature is maintained for an hour and then the material is force cooled to 142° F. over a period of one-half hour. The latex is now vulcanized and is a substantially different material from ordinary rubber latex. Some of the difference between vulcanized latex and ordinary latex are exhibited by a change in the particle size and shape as seen under an ultramicroscope. Vulcanized latex does not have a pronounced tacky characteristic as found in latex and even when air dried in a film gives a rubber which is far less tacky than latex. Also vulcanized latex exhibits a much higher surface tension than ordinary latex. When tested by treatment with chloroform, the vulcanized material changes to a loose curd while latex is converted to a coherent, sticky ball or gob. Vulcanized latex is rendered substantially sterile by the vulcanizing treatment and in this respect is distinguishable from latex.

The vulcanized latex is then allowed a settling period in a sedimentation tank where the excess sulphur and curing ingredients settle to the bottom making it possible to draw off the clear milky liquid on top. Other suitable vulcanization and clarification processes may be employed if desired.

After the clarification processes, the cured latex, at 30% to 40% total solid content, is introduced to a centrifugal, preferably of the De Laval type. By controlling the input rate to the machine, a concentrate of 60–70% rubber solids may be obtained and likewise a dilute phase of 8–12% solids. The rubber in the concentrated phase has been well separated from approximately 65% of natural protein, approximately 75% of the water solubles, and approximately 30% of the resins. A large proportion of the protein, water extract and resins (acetone extract) is found in the dilute phase.

After this concentration, the concentrate phase is diluted with water and ammonia added to replace that lost until the material resembles the condition in which it was originally introduced to the centrifugal machine, and the diluted material is passed through the centrifugal machine at such an input speed that the concentrated phase recovered will have approximately 60–70% total solids. In this second operation, it is found that the dilute phase contains approximately 4–6% solids. In certain cases, it may be desirable to again dilute the concentrate phase of the second concentration with ammonia and water and again pass through the centrifugal machine whereby a concentrate phase in the neighborhood of 60–70% total solids is again obtained, but whereby the dilute phase will be appreciably lower in total solid content and may be obtained as low as 1% total solids.

The dilute phases from each of the separate concentrating runs can be combined and the solids which are rubber hydrocarbon can be recovered largely by further centrifugalization. Most of the ammonia in the original material as vulcanized, as well as that added during the washing or diluting processes, is removed by the concentrating operations. If desirable, ammonia or other volatile preservatives may be added to the final product, although the material appears commercially stable, and may be transported long distances without any tendency toward coagulation.

A film produced by evaporation of the dispersing phase from the concentrated material does not water-spot to a milky color and is high in characteristics of di-electric strength, elasticity and durability.

It will be obvious that the method steps of vulcanizing, clarifying, concentrating and scavenging may be applicable as well to artificial aqueous dispersions of rubber particles as to normal or natural latex.

What I claim is:—

1. That improvement in methods of purifying vulcanized rubber latex which consists in mechanically separating most of the vulcanized rubber particles from part of the serum in which they are suspended and from a high proportion of the non-rubber constituents carried by said serum while maintaining said particles in a dispersed condition, removing practically all of the proteins and water soluble constituents together with excess of vulcanizing agents and side reaction products, from the dispersion of rubber particles by washing them with water and ammonia, and, throughout the process, maintaining the serum and washing liquid free from non-rubber constituents other than those originally contained in the vulcanized latex.

2. That improvement in methods of purifying vulcanized rubber latex which consists in centrifuging the vulcanized latex and thereby dividing it into a concentrate phase containing most of the vulcanized rubber particles and a dilute phase containing a high proportion of the non-rubber constituents, diluting the concentrate phase so produced, repeating the centrifuging operation to effect a further separation of the vulcanized rubber particles from the liquid, and, throughout the process, maintaining the serum and washing liquid free from non-rubber constituents other than those originally contained in the vulcanized latex.

3. That improvement in methods of purifying and concentrating vulcanized rubber latex which consists in centrifuging the vulcanized latex and thereby dividing it into a concentrate phase containing most of the vulcanized rubber particles and a dilute phase containing a high proportion of the non-rubber constituents, washing the rubber particles in the concentrate phase so produced, separating the washed rubber particles from surplus serum and washing liquid and the non-rubber constituents carried by them, avoiding the addition of non-rubber constituents other than ammoniacal water to either the serum or the concentrate phase at any stage of the process, and preventing any substantial coagulation of the rubber particles at any stage of the process.

4. That improvement in methods of purifying aqueous dispersions of rubber which consists in vulcanizing the rubber particles in the dispersion while maintaining them in a dispersed condition, separating most of the non-rubber solids introduced by the vulcanizing step from the other constituents of the dispersion, centrifuging the remaining dispersion under controlled conditions to separate most of the vulcanized rubber particles from a considerable proportion of the serum and the non-rubber constituents carried by said serum, diluting the concentrate phase containing the vulcanized rubber particles so separated, repeating the centrifuging operation to effect a further separation of the rubber particles from the surplus liquid and the non-rubber constituents, preventing any substantial coagulation of the rubber particles at any stage of the process, and avoiding the addition to said serum or said concentrate phase of any protective colloid, or creaming agent, at any stage of the process.

5. A purified vulcanized latex free of protective colloids and from which the suspended protein and all water soluble and water attracting constituents, and excess of vulcanizing agents, together with side reaction products have been substantially removed.

6. A purified vulcanized latex, commercially stable, but free of protective colloids, and practically free of proteins and water soluble constituents, and from which excesses of vulcanizing agents, together with side reaction products have been substantially removed, and containing not more than a negligible proportion of the resins natural to the original latex.

7. A purified vulcanized latex free of protective colloids and from which excesses of vulcanizing agents together with side reaction products, have been substantially removed, and which will dry practically free of constituents soluble in water or capable of adsorbing or absorbing water.

8. A purified and concentrated vulcanized latex, commercially stable, but free of protective colloids, and practically free of proteins and water soluble constituents, and from which excesses of vulcanizing agents, together with side reaction products have been substantially removed, and approximately devoid of free ammonia.

9. A solid consisting of connected particles of vulcanized latex rubber free of protective colloids and from which excesses of vulcanizing agents, together with side reaction products, have been substantially removed, and substantially devoid of constituents soluble in water or capable of taking up water.

10. That improvement in methods of purifying and concentrating vulcanized rubber latex which consists in centrifuging the vulcanized latex and thereby dividing it into a concentrate phase containing most of the vulcanized rubber particles and a dilute phase containing a high proportion of the non-rubber constituents, maintaining said particles in a dispersed condition during said centrifuging operation, and avoiding the addition of any protective colloid to either the serum or said concentrate phase at any stage of the process.

11. That improvement in methods of purifying rubber latex, which consists in first vulcanizing the latex and then separating most of the vulcanized rubber particles from part of the serum in which they are suspended and removing a high proportion of the non-rubber constituents carried by said serum, while maintaining said particles in a dispersed condition, by centrifuging the vulcanized latex and dividing same into dilute and concentrate rubber phases, removing practically all of the proteins and water soluble constituents together with excesses of sulphur and other curing ingredients from the dispersion of rubber particles by washing them with water and ammonia, and thereby controlling after-cure, and throughout the process maintaining the serum and washing liquid free from non-rubber constituents other than those originally contained in the vulcanized latex.

HENRY B. TOWNSEND.